United States Patent
Campomanes et al.

(10) Patent No.: US 11,676,262 B2
(45) Date of Patent: Jun. 13, 2023

(54) METHODS AND SYSTEMS FOR DETERMIING PART WEAR USING A BOUNDING MODEL

(71) Applicant: Caterpillar Inc., Peoria, IL (US)

(72) Inventors: Patrick Simon Campomanes, Washington, IL (US); Graham Ray Hartoonian, Peoria, IL (US); Brandon Hammig McCaffrey, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 52 days.

(21) Appl. No.: 17/399,609

(22) Filed: Aug. 11, 2021

(65) Prior Publication Data
US 2021/0374943 A1 Dec. 2, 2021

Related U.S. Application Data

(62) Division of application No. 16/537,269, filed on Aug. 9, 2019, now Pat. No. 11,138,718.

(51) Int. Cl.
*G06K 9/00* (2022.01)
*G06T 7/00* (2017.01)
(Continued)

(52) U.S. Cl.
CPC ............ *G06T 7/0004* (2013.01); *E02F 9/267* (2013.01); *G06T 7/50* (2017.01); *G06T 17/00* (2013.01); *G06T 2207/30164* (2013.01)

(58) Field of Classification Search
CPC ....... G06T 17/00; G06T 7/50; G06T 2200/08; G06T 2200/21; G06T 2207/10028; G06T 7/521; G06T 17/10–30; G06T 2200/04; G06T 7/564; G06T 11/00; G06T 11/001; G06T 11/20; G06T 11/40; G06T 11/203;
(Continued)

(56) References Cited

U.S. PATENT DOCUMENTS

| 4,845,763 A | 7/1989 | Bandyopadhyay et al. |
| 5,361,308 A | 11/1994 | Lee et al. |

(Continued)

FOREIGN PATENT DOCUMENTS

| EP | 2108071 B1 | 10/2012 |
| EP | 3235960 | 10/2017 |

(Continued)

OTHER PUBLICATIONS

Japanese Office action for Int'l. Patent Appln. No. 2022-507896, dated Mar. 7, 2023 (4 pgs).

*Primary Examiner* — Atiba O Fitzpatrick
(74) *Attorney, Agent, or Firm* — Lee & Hayes, PLLC

(57) ABSTRACT

A method for determining part wear, such as using a wear metric, includes receiving, from a sensor, sensor data representing a surface of a wear part. The method further includes determining distances between measured points in the sensor data and points on one or more part models, which part models may include new part models and/or worn or wear limit part models. The method further includes using a bounding model that at least partially envelopes the part model(s) and the measured points to determine a direction along which the distances are measured. The method may also include quantifying wear using the measured distances.

20 Claims, 7 Drawing Sheets

(51) Int. Cl.
*G06T 7/50* (2017.01)
*E02F 9/26* (2006.01)
*G06T 17/00* (2006.01)

(58) Field of Classification Search
CPC ..... G06T 7/60–75; G01S 17/88; G01S 17/89; G01S 17/894; G01B 11/24; G01B 11/255; G01B 11/02; G01B 11/022; G01B 11/03; G01B 11/028
See application file for complete search history.

(56) References Cited

U.S. PATENT DOCUMENTS

| | | | |
|---|---|---|---|
| 9,613,413 | B2 | 4/2017 | Hasselbusch et al. |
| 9,873,994 | B2 | 1/2018 | Wagner et al. |
| 9,875,535 | B2 | 1/2018 | Finch et al. |
| 10,249,060 | B2 | 4/2019 | Wagner et al. |
| 10,262,411 | B2 | 4/2019 | Kean |
| 2014/0105481 | A1* | 4/2014 | Hasselbusch ......... G06T 7/0006 |
| | | | 382/141 |
| 2015/0149049 | A1 | 5/2015 | Bewley et al. |
| 2015/0170412 | A1* | 6/2015 | Bendall ................. G01B 13/22 |
| | | | 382/119 |
| 2016/0155015 | A1* | 6/2016 | Bendall ............. G01N 21/8851 |
| | | | 382/199 |
| 2016/0171705 | A1* | 6/2016 | Bendall .................. G01B 11/24 |
| | | | 382/103 |
| 2016/0237640 | A1 | 8/2016 | Carpenter et al. |
| 2016/0376771 | A1 | 12/2016 | Behmlander et al. |
| 2017/0236261 | A1* | 8/2017 | Finch ...................... G06F 18/22 |
| | | | 382/152 |
| 2017/0270720 | A1 | 9/2017 | Aydin et al. |
| 2017/0352199 | A1* | 12/2017 | Finley ....................... G06T 7/13 |
| 2018/0087246 | A1 | 3/2018 | Pratt |
| 2018/0165884 | A1 | 6/2018 | Wagner et al. |
| 2019/0139211 | A1* | 5/2019 | Morawitz .............. B62D 55/26 |
| 2019/0145183 | A1* | 5/2019 | Potash .................... E21B 10/00 |
| | | | 700/175 |
| 2020/0003668 | A1 | 1/2020 | Schwalbach et al. |
| 2021/0363833 | A1* | 11/2021 | Potash ............... G01N 21/8851 |

FOREIGN PATENT DOCUMENTS

| | | |
|---|---|---|
| JP | 2015052555 | 3/2015 |
| JP | 2016504643 | 2/2016 |
| WO | 2011099337 | 8/2011 |
| WO | WO2018009955 A1 | 1/2018 |
| WO | WO2019053468 A1 | 3/2019 |

* cited by examiner

METHODS AND SYSTEMS FOR DETERMIING PART WEAR USING A BOUNDING MODEL

PRIORITY

The present application is a divisional of U.S. patent application Ser. No. 16/537,269, filed on Aug. 9, 2019, entitled "METHODS AND SYSTEMS FOR DETERMINING PART WEAR USING A BOUNDING MODEL", the entirety of which is incorporated herein by reference.

TECHNICAL FIELD

The present disclosure relates generally to determining part wear, and, more particularly, to methods and systems for determining part wear using sensor data of a used or worn part and models associated with the part.

BACKGROUND

To facilitate earth working activities (e.g., mining, construction, dredging, or the like), machines are outfitted with ground-engaging tools. For instance, tools including but not limited to teeth, shrouds, and/or lips may be commonly provided to protect underlying equipment from undue wear and/or to perform other functions. By way of non-limiting example, an excavating bucket may be provided with excavating teeth and/or shrouds attached to a lip of the bucket to initiate contact with the ground, e.g., prior to the lip of the bucket. During use, such ground-engaging products can encounter heavy loading and/or highly abrasive conditions. These conditions cause the ground-engaging products to become worn and, eventually, to wear out or fail. Excessive wear can result in breakage and/or loss of the ground-engaging tools, which can result in decreased productivity, increased costs in repair and/or maintenance, and other problems. Accordingly, it may be desirable to monitor part wear, e.g., to understand and/or quantify wear part including to replace parts prior to failure.

Systems have been designed with a view toward attempting to determine wear associated with a part. For example, U.S. Pat. No. 9,613,413 to Hasselbusch et al. ("the '413 Patent") describes systems and methods for determining part wear using a mobile device. For instance, the '413 patent describes capturing digital images using a camera on the mobile device and determining distances, e.g., based on a number of pixels, of wear surfaces of the imaged part from a surface of a simulated surface of an unworn part and/or a spent/worn part. In examples of the '413 patent, the degree of wear may be determined based on these distances.

While the system described in the '413 Patent may quantify wear, the distances calculated according to the techniques described therein may not accurately reflect wear patterns. For instance, wear can occur irregularly at different surfaces, and the techniques of the '413 patent may not account properly for such wear. By way of non-limiting example, the techniques described in the '413 patent may measure distances other than in the direction of wear, thereby returning an inaccurate wear percentage.

The present disclosure is directed to one or more improvements in the existing technology.

SUMMARY

One aspect of the disclosure is directed to a computer-implemented method that includes receiving sensor data corresponding to a surface of a part. The sensor data includes information about a plurality of points on the surface. The method may also include receiving a first model associated with an unworn part corresponding to the part and receiving a second model associated with a wear limit part corresponding to the part. The first model may define a first contour of the unworn part and the second model may define a second contour of the wear limit part. The method may also include generating a bounding contour spaced from the surface, the first contour, and the second contour and determining, for a point of the plurality of points, at least one of a first distance between the point and a first position on the first contour; or a second distance between the point and a second position on the second contour. The method may also include determining, based on the at least one of the first distance or the second distance, a wear metric associated with the part, wherein the first distance and the second distance are along a line extending from the bounding contour and through the point.

Another aspect of the disclosure is directed to a system including one or more processors; and computer-readable media storing instructions that, when executed, cause the one or more processors to performs acts. The acts may include receiving information about a surface of a part and generating, based at least in part on the information, a first model of the part. The acts may also include comparing the first model to a second model including information about a surface of an unworn part corresponding to the part, a third model including information about a surface of a wear limit part corresponding to the part, and a fourth model associated with a bounding surface at least partially enveloping the first model, the second model, and the third model. The acts may also include determining, based on the comparing, a wear metric associated with the part.

Another aspect of this disclosure is directed to non-transitory computer-readable media storing instructions that, when executed, cause one or more processors to perform operations. The operations may include receiving information about an outer surface of a wear part. The information includes a plurality of points in a three-dimensional coordinate system. The operations may also include receiving a first model associated with a first three-dimensional representation of a surface of an unworn part corresponding to the wear part; receiving a second model associated with a second three-dimensional representation of a surface of a wear limit part corresponding to the wear part, the surface of the wear limit part corresponding to a wear limit associated with the part; and receiving a third model associated with a bounding contour at least partially enveloping the surface of the unworn part. The operations may also include determining, for individual points of the plurality of points, at least one of a first distance between a first position on the bounding contour and the individual point, a second distance between the first position on the bounding contour and a second position on the surface of the unworn part, or a third distance between the first position on the bounding contour and a third position on the surface of the wear limit part. The second distance and the third distance are measured along a direction extending from the first point on the bounding contour and through the individual point. The operations may also include determining, based at least in part on at least one of the first distance, the second distance, or the third distance, a wear metric for the part.

DETAILED DESCRIPTION

Figure 1:
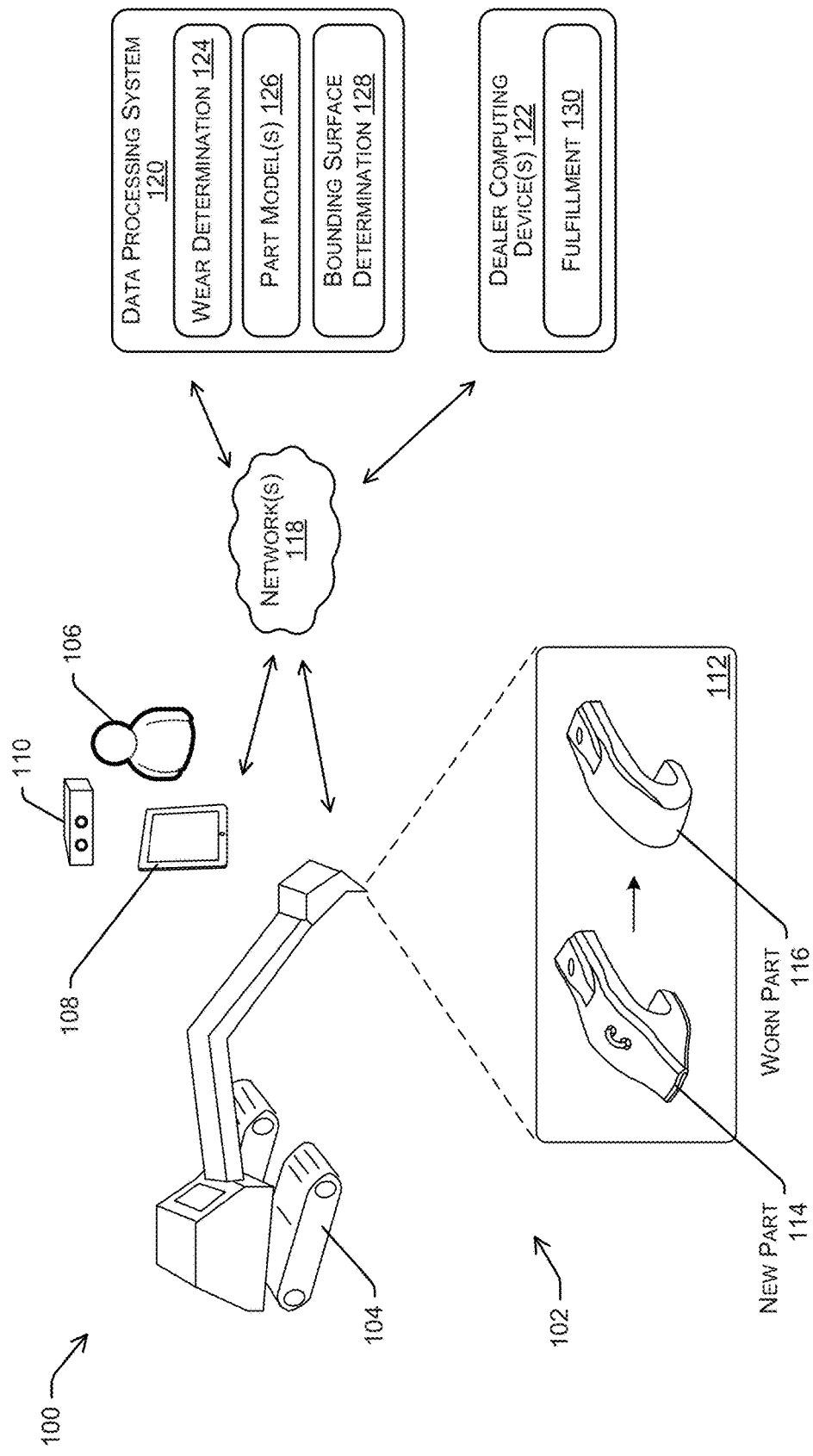
FIG. 1 is a representation of an exemplary environment for determining part wear, according to aspects of this disclosure.

This disclosure generally relates to methods, systems, and techniques for determining wear of parts. While specific parts described herein may be parts on machines, e.g., ground-engaging machines, earth-moving machines, or the like, the techniques described herein may be applicable to any number of parts that wear over time, e.g., from abrasion, corrosion, or the like. Where possible, the same reference numerals are used through the drawings to refer to the same or like features.

FIG. 1 illustrates an example environment 100 for determining part wear based on sensor or image data of the part, according to implementations of this disclosure. Components of the environment 100 may interact with each other to enable a user, e.g., a machine operator, site manager, or the like, to easily determine the degree of wear of a machine part, e.g., a wear part, based on sensor data associated with the part, e.g., captured using an imaging sensor. As illustrated, the environment 100 can include a job or machine site 102 at which a machine 104 is performing one or more functions, including but not limited to earth-moving or excavating functions. The machine site 102 can also include a user 106, a user device 108 associated with the user, and/or an imaging sensor 110, which may also be associated with (or operated by) the user 106. The machine site 102 may represent any location at which the machine 104 and/or the user 106 may be present. For example, and without limitation, the machine site 102 can include a worksite, a repair shop, a dealership, a residence, a mine, a quarry, a highway or road, or the like. As detailed further herein, the user 106 may capture sensor data, e.g., point cloud data representative of a part, at the machine site 102 using the sensor 110, which may be incorporated into the user device 108 (although in some examples the sensor 110 or imager may be separate from the user device 108).

The machine 104 may be one of any of a variety of machines, but generally includes a machine having one or more parts that are susceptible to wear, e.g., resulting from forces acting on such parts during operation of the machine 104, and must be replaced over time as a result of such wear. The machine 104 is illustrated as a bucket loader which may have teeth secured proximate a lip of the bucket. For instance, an enlarged view 112 accompanying the depiction of the machine 104 shows a new part 114, which is a tooth, and a worn part 116, which corresponds to the new part 114 after some amount of work performed by the machine 104 (and the new part 114). Stated differently, the worn part 116 may depict an in-use part to be imaged using the sensor 110, whereas the new part 114 may depict an "as manufactured" or nominal part. Although FIG. 1 uses a bucket loader as the machine 104 and a ground-engaging tooth as the illustrated part 116, other examples are contemplated. For example, and without limitation, the machine 104 may represent a work machine, such as a track-type tractor, a wheel loader, a generator set, an oil drill, or any other type of machine that performs an intensive work task. In addition to or instead of the illustrated teeth, work machines may include other high-stress parts including tracks made of individual track links, blades having edges for moving materials, and/or other parts that wear over time as the machine is used to perform various tasks. Other examples of the machine 104 can include an industrial transport machine, such as a locomotive, a haul truck, a bus, an aircraft, or other such machine that moves people or payloads. By way of nonlimiting example, an aircraft may have turbine fan blades, bleed ports, or other parts subject to high stresses that cause such parts to wear over time and need periodic replacement. The machine 104 may also embody a vehicle, such as a passenger truck or car. Such machines also have high-stress parts, such as axles or tires, that wear with use and eventually need replacing. In still further implementations, the machine 104 may be a work tool, such as a saw or drill having one or more parts, such as teeth or bits, that wear over time with use. In this disclosure, parts of the machine 104 that are subject to stresses that cause such parts to wear over time and with use, may referred to as "wear parts." Techniques described herein can determine wear of such wear parts.

The user 106 may be any person or entity associated with the machine 104. By way of nonlimiting example, the user 106 may be an owner, an operator, a technician, a repair person, a customer service representative, dealer personnel, or any other person concerned with the machine 104. As noted above, and explained in more detail herein, the user 106 may operate the sensor 110 to capture sensor data of wear parts, such as the worn part 116. In examples, the sensor 110 may be a three-dimensional camera or a range finding sensor, including but not limited to a radar sensor, a LiDAR sensor, or the like. By way of non-limiting example, the sensor 110 can be a time-of-flight sensor configured to generate depths associated with each captured pixel. In examples, the sensor 110 can be mounted, e.g., in association with an image capture station and the worn part 116 may be placed relative to the sensor 110 for sensing and/or image capture. In other implementations, the sensor 110 can be operable by the user 106 to capture sensor and/or image data about the worn part 116 e.g., with the worn part mounted on the machine 104. By way of non-limiting example, the sensor 110 may be a hand-held or otherwise moveable imager or sensor and the user 106 may situate the sensor 110, e.g., at the machine site 102, to capture images of the worn part 116.

The user device 108 may be a mobile device carried by or otherwise accessible to the user 106 at the machine site 102. In implementations, the user device 108 may be embodied as a smartphone, a mobile phone, a tablet computer, a personal digital assistant, a network-enabled camera or sensor, or other computing device. Moreover, and as described herein, the user device 108 may include functionality to determine a degree of wear of the worn part 116, e.g., relative to the new part 114. By way of nonlimiting example, the user device 108 can receive sensor data, e.g., point cloud data, generated by the sensor 110. In some examples, functionality of the sensor 110 and the user device 108 may be integrated into a single device, e.g., the user device 108 may have an integrated sensor 110. In other examples, the user device 108 may receive sensor data from the sensor 110, e.g., via a physical connection, a wireless connection, and/or a network 118.

As also illustrated in FIG. 1, the environment 100 may include one or more data processing systems 120 and one or more dealer computing device(s) 122. As illustrated, the data processing system(s) 120 and the dealer computing device(s) 122 may be configured to communicate with one or more of the machine 104, the user device 108, and/or the sensor 110 via the network(s) 118. Although the data processing system(s) 120 and the dealer computing devices 120 are shown as separate from each other, as well as from the machine 104, the user device 108, and the sensor 110, in some examples, functionality of one or more of these components may be carried out over fewer devices. By way of non-limiting example, the user device 108 may include some or all functionality of the data processing system(s) 120. Moreover, functionality described herein and ascribe to one or more of the illustrated components may further be performed by a different one or more of the components and/or by entirely different components.

The data processing system(s) 120 are generally configured to receive sensor data generated by the sensor 110 of the worn part 116 and determine a wear metric associated therewith. As used herein, "wear metric" may refer to any quantification of wear of a part. For instance, a wear metric may be a percentage wear, e.g., relative to a new part, such as the new part 114, and/or relative to a spent or "worn-out" part, which may correspond to the maximum wear allowable before expected failure or some other wear limit. The wear metric may also or alternatively be measured as a distance, e.g., corresponding to a distance associated with the wear, as detailed further herein. As illustrated in FIG. 1, the data processing system(s) 120 can include a wear determination component 124, one or more part model(s) 126, and a bounding surface determination component 128.

In examples, the wear determination component 124 can receive sensor data, e.g., captured by the sensor 110, and compare the sensor data to the part model(s) 126. For example, the wear determination component may receive point cloud data including a number of points associated with depths captured by the sensor 110, e.g., when the sensor is a ranging-type sensor. The wear determination component 124 can determine positions in a coordinate system corresponding to the depths. By way of non-limiting example, the wear determination component 124 can determine positions associated with measured depths in a three-dimensional (e.g., x, y, z) coordinate system. For example, the measured depths may be associated with a surface of the worn part 114 and in some implementations, the wear determination component 124 can generate a three-dimensional model of the measured worn part 114 and orient the model in the coordinate system.

The wear determination component 124 may also be configured to align the sensor data with the part model(s) 126. In examples described herein, the part model(s) 126 may include one or more of a new part model, e.g., a model of the new part 114 and/or a wear limit part model. As detailed further herein, the new part model may include coordinates of a surface of a substantially new part and/or of a nominal part associated with the new part 114. The wear limit part model may include coordinates of a surface, e.g., of points on the surface, associated with a maximally worn part. For instance, the wear limit part model may describe an outer contour associated with a part that is at the brink of failure or otherwise expected to fail imminently. In other examples, the part model(s) 126 may include one or more additional models associated with other stages of wear of a wear part. By way of nonlimiting example, a part model may describe surfaces corresponding to other degrees of wear, including, but not limited to, configurations associated with a wear part that has 10% remaining life (that is 90% worn), or the like. In examples described herein, when measured points on the worn part 116 correspond to points on the wear limit model, the worn part 116 may be in need of replacement. As detailed further herein, selecting a wear limit part model may dictate when a part will be replaced, and thus selection of the wear limit part model may be based at least in part on a desired condition that will suggest replacement.

The wear determination component 124 may compare the sensor data, e.g., position of measured points on the surface of the measured worn part 116 to the part model(s) 126. In implementations, the data processing system(s) 120 may align the sensor data representing the measured worn part 116, e.g., the points generated by the sensor 110, with one or more of the part model(s) 126 to determine distances between the measured points and positions or locations on the part model(s) 126. In one example, the wear metric may be a percentage corresponding to a ratio of a first distance between a position on a new part model and a measured position (e.g., on the worn part 116) and a co-linear second distance between the position on the new part model and a position on the spent part model.

The bounding surface determination component 128 may generate, receive, or otherwise access a bounding surface or bounding contour according to implementations of this disclosure. As detailed further herein, the bounding surface or contour may be a model, like the part model(s) 126 used by the wear determination component 124 to determine a wear metric. In examples, the bounding surface determination component 128 can generate or select a bounding surface, model or contour that at least partially envelopes, e.g., that is bigger than, the part model(s) 126 and/or the measured worn part 116. As described herein, the bounding surface determined by the bounding surface determination component 128 may define orientations along which distances are measured to determine wear. By way of nonlimiting example, a bounding contour may serve as an additional model that may be aligned by the wear determination component 124 with the part model(s) 126 and the measured points of the worn part 116 (or a model of the worn part 116 based on the measured points). In some instances, lines normal to the bounding surface may serve as directions along which distances, e.g. distances between a measured point and one or more points on the part model(s) 126, may be measured. Thus, the bounding surface may function to orient directions of measurement. According to implementations described herein, orienting the directions in this manner may provide more accurate results compared to conventional models. For instance, some conventional models may measure a distance between a measured point and a closest point on a part model. However, such processes may result in an inaccurate calculation of wear, which may result in overuse of parts e.g., causing disruptive failures, and/or underuse of parts, thereby increasing cost.

Depending upon the configuration of the environment 100, the data processing system(s) 120 may have different roles or different degrees of involvement in carrying out the disclosed techniques. For instance, aspects of the environment 100 may be configured as a server-based environment or a cloud-based environment that perform the disclosed wear determination techniques as part of the service over the network(s) 118. In such a server- or cloud-based environment, the data processing system(s) 120 (e.g., the server or cloud), may receive sensor data from the sensor 110 and/or from the user device 108 (which may receive the sensor data from the sensor 110). In this example, the data processing system(s) 120 may then process the sensor data to determine the degree of wear of parts, and return results of the processing to the user device 108 over the network(s) 118. Thus, in a server- or cloud-based environment, the data processing system(s) 120 may perform the bulk of the computing operations, while the user device 108 may function as a portal (e.g., via an application or browser) that allows the user 106 to access the services of the data processing system(s) 120 over the network(s) 118. In some examples, the user device 108 may access, e.g., download, a software application that allows the user 106 to access the data processing system(s) 120 and/or two interact with data received from the data processing system(s) 120, as detailed further herein.

The environment 100 also includes the dealer computing device(s) 122, which may represent one or more computing systems associated with a dealer that sells or rents the machine 104 and/or parts for the machine 104, including the new part 114. In some implementations, the dealer may have a relationship with the user 106. For instance, the user 106 may be a customer or potential customer and/or some other individual having an interest in knowing a status of the machine 104. In some implementations, the dealer may desire to know when a wear part of the machine 104, such as the illustrated tooth, has become sufficiently worn so that it can inspect or service the machine 104 and/or provide replacement parts or services relative to the machine 104. As with other elements of the environment 100, the dealer computing device(s) 122 may include any number or combination of computing elements enabling communication, storage, and processing to carry out the disclosed techniques. Among other things, the dealer computing device(s) 122 may include a fulfillment component 130, which may be configured to automatically order a replacement part, e.g., the new part 114, and/or scheduled maintenance associated with the machine 104 in response to the data processing system(s) 120 determining that a wear part is worn to somewhere threshold. In at least some examples, the dealer computing device(s) 122 may also incorporate the data processing system(s) 120. For instance, the dealer computing device(s) 122 may be a centralized monitoring and/or service provider capable of determining that parts are worn as well as taking actions, including providing replacement parts, in response to such wear determination. In at least some examples, the dealer computing device(s) 122 may receive notifications, such as emails or text messages, from other elements of the environment, e.g., the data processing system(s) 120 and/or the user device 108, indicating that a wear part of machine is sufficiently worn, e.g. that the wear metric meets or exceeds a threshold wear metric. In response to such notifications, the dealer computing device(s) 122 may, e.g., using the fulfillment component 130, determine an adequate or appropriate replacement part and arrange for presentation of the replacement part to the user 106 at the machine site 102. In other instances, the dealer computing device(s) 122 may provide other instructions to the user device 108, e.g. instructing a user with one or more actions to take in response to the determined wear metric. Such instructions may be for the user 106 to bring the machine 104 in for inspection, service, or the like and/or to arrange for a technician, who may be associated with the dealer, to visit the machine location 102. The dealer computing device(s) 122 may also prompt the user, e.g., via a message or other transmission to the user device 108, to order a replacement part.

In FIG. 1, the network(s) 118 may represent any type combination of electronic communication networks configured to communicate data between nodes connected to the network(s) 118. For example, and without limitation, the network(s) 118 may represent the Internet, an ethernet, a local-area network, a wide-area network, a personal area network, a cellular network, a telephone network, or any combination thereof. In at least some embodiments, the network(s) 118 may include a mobile network and related infrastructure operable to provide Internet connectivity to the user device 108 such as according to a 2G, 3G, 4G, 5G, and/or LTE communication network.

Figure 2:
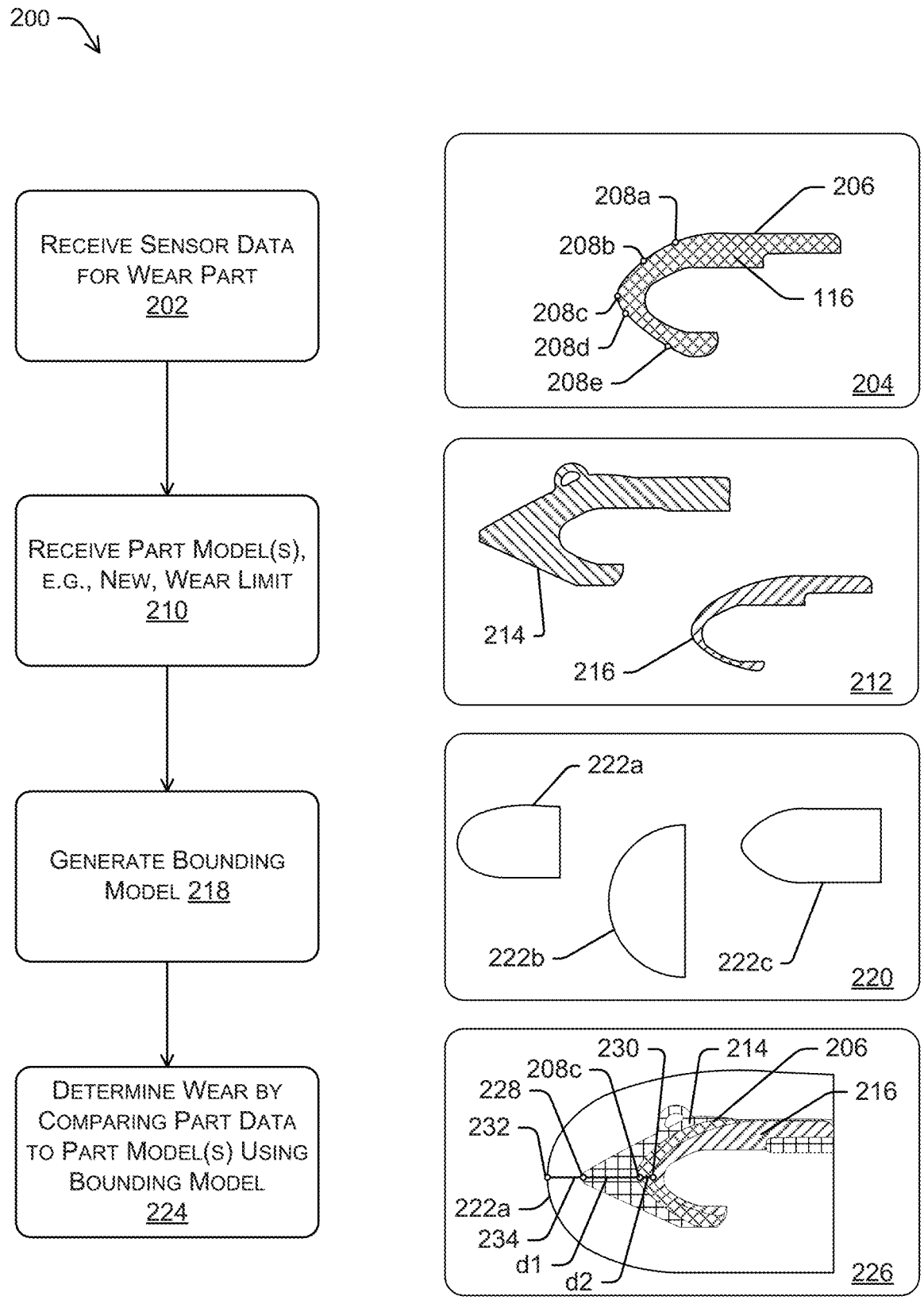
FIG. 2 includes textual and graphical flowcharts describing and illustrating processes for determining a wear metric for a wear part, according to aspects of this disclosure.

FIG. 2 includes textual and graphical flowcharts that describe and illustrate techniques according to this disclosure. More specifically, FIG. 2 describes and illustrates a process 200 for determining a wear metric for a wear part, such as the worn part 116 shown in the enlarged view 112 of FIG. 1. For example, the process 200 described and illustrated in FIG. 2 can be implemented in whole or in part by components of the environment 100, including the user device 108, the sensor 110, and/or the data processing system(s) 120 illustrated in FIG. 1. However, the techniques of FIG. 2 are not limited to being performed by these components and these components are not limited to performing the techniques described and illustrated in FIG. 2.

At operation 202, the process 200 can include receiving sensor data for a wear part. For example, in the example environment 100 described above in connection with FIG. 1, the user 106 may use the sensor 110 to generate sensor data associated with a wear part, such as the worn part 116. As illustrated in an example 204 accompanying the operation 202, the sensor data may be indicative of the surface 206 of a part, such as the worn part 116. For clarity, the worn part 116 is shown in profile, e.g. as a two-dimensional representation of the worn part 116. However, while shown in a two-dimensional coordinate system, techniques described in association with FIG. 2 are equally applicable to alternate coordinate systems, including but not limited to three-dimensional coordinate systems. As will be appreciated, the sensor data, such as captured by the sensor 110 may include a plurality of measured points, of which a first measured point 208a, a second measured point 208b, a third measured point 208c, a fourth measured point 208d, and a fifth measured point 208e (collectively referred to as "the measured points 208") are illustrated in the example 204. In examples, the measured points 208 may comprise a point cloud or other collection of depth or positional measurements generated by the sensor 110. Although additional surfaces associated with the worn part 116 are also illustrated in the example 204, those having ordinary skill in the art will understand that the sensor data of the part may include only the measured points 208 describing the surface 206. Additional surfaces are shown in the example 204 for reference, and to illustrate an outline of the worn part 116. By way of non-limiting example, surfaces opposite the measured surface 206, e.g., mounting surfaces of the worn part 116, may be expected to experience minimal wear, and thus may not be sensed in implementations described herein.

At operation 210, the process 200 can include receiving one or more part models. For instance, the part models can include a new part model and a worn or wear limit part model. The new part model may be associated with a new or unused part, such as the new part 114. The worn or wear limit part model may correspond to a minimum acceptable surface associated with the worn part 114. An example 212 accompanying the operation 210 illustrates a new part model 214 and a wear limit part model 216. As with the depiction in the example 204, the new part model 214 and the wear limit part model 216 are illustrated as two-dimensional models, for clarity. As will be appreciated, however, the new part model 214 and the wear limit part model 216 can be three-dimensional models in implementations of this disclosure. Each of the new part model 214 and the wear limit part model 216 generally describes surfaces or contours of surfaces associated with the same part, but at different times in the parts useful life. For instance, the new part model 214 generally corresponds to a brand-new or nominal part. For examples, the surfaces associated with or defined by the new part model may be derived from technical specification and/or renderings of the part. In contrast, the wear limit part model 216 generally describes contours of a corresponding worn part. In implementations, the wear limit part model 216 may describe a spent or completely worn part, e.g., descriptive of a part contour or surface that may be expected to fail imminently. In other implementations, the wear limit part model 216 may correspond to some other contour at some other degree of wear of the original part. By way of nonlimiting example, the wear limit part model 216 may be configured by the user 106 or some other individual associated with the machine 104 to designate aspects of a contour that correspond to the end of a useful life of the part. In a simplistic example, the new part model 214 may correspond to an off-the-shelf part whereas the wear limit part model 216 may correspond to a part that is expected to fail imminently and thus should be replaced immediately. In some examples, the new part model 214 may correspond to manufacturing specifications or a nominal description of a new part, such as the new part 114. In contrast, the wear limit part model 216 may correspond to a contour at which each point on a ground engaging, e.g., outside, surface should be subject to no further wear.

At an operation 218, the process 200 may include generating a bounding model. Aspects of this disclosure may use a bounding model to determine orientations and/or directions along which wear can be measured, as detailed further herein. An example 220 accompanying the operation 218 schematically illustrates a number of representative bounding models. More specifically, the example 220 includes representation of a first bounding model 222a, second bounding model 220b, and a third bounding model 222c. Collectively, the first bounding model 222a, the second bounding model 222b, and the third bounding model 222c are referred to herein as the bounding models 222. Generally, the bounding models 222 represent surfaces that at least partially envelop the part models, e.g., the new part model 214 and the wear limit part model 216, as well as the measured surface 206 of the worn part 116. In implementations, the bounding surfaces 222 may depend upon the type of part being measured, expected wear patterns associated with the measured part, and/or other factors.

At an operation 224, the process 200 can include determining wear by comparing part data to the part models using the bounding model. An example 226 accompanying the operation 224 demonstrates techniques for determining a wear metric using the sensed data, the part model(s), and the bounding models. As conceptualized in the example 226, the operation 224 may include aligning the new part model 214, the wear limit part model 216, the surface 206 of the worn part 116, and the bounding model 222. For example, such alignment may be performed using a common feature of the models, such as a mounting hole, a mounting surface, or the like. In the example 226, the first bounding model 222a is used, and the example 226 specifically demonstrates determining a wear metric associated with the third measured point 208c on the surface 206. As described above, the third measured point 208c has a known depth, e.g. as measured by the sensor 110, and the depth associated with the third measured point 208c can be located in a coordinate system. Positions, including a position 228 along the new part model 214, positions, including a position 230 on the wear limit part model 216, and positions, including a position 232 on the bounding model 222a can also be determined in the coordinate system. In the example 226, a line 234 extends from the position 232 on the bounding model 222a to the position 230 on the wear limit part model. In this example, the line 234 is perpendicular or normal to the bounding model 222a at the position 232.

In some examples, a wear metric associated with the third measured point 208c may be based at least in part on distances between the third measured point 208c and one or both of the position 228 on the new part model 214 and/or the position 230 on the wear limit part model 216. For instance, the example 226 illustrates a first distance d1 as a distance between the position 228 on the new part model 214 and the measured point 208c and a second distance d2 as a distance between the measured point 208c and the position 230 on the wear limit part model 216. In implementations, a wear metric associated with the third measured point 208c may be a ratio of the first distance d1 to the combined distance of d1 plus d2. This ratio may correspond to a percentage of wear for the part, e.g., because it is the ratio of worn material (at the third measured point 208c) to the total material, relative to the wear limit. As will be appreciated, because the sum of d1 and d2 is constant, e.g., because the new part model 214 and the wear limit part model 216 are fixed, predetermined models, when d1 is relatively smaller, the wear percentage will be relatively smaller, e.g., less of the part will be worn, whereas when d1 is relatively larger, the wear percentage will be relatively greater, e.g., more of the part will be worn. Other wear metrics also are contemplated. For example, in other implementations, the ratio of d2 to the sum of d1 and d2 may be representative of a percentage of the part (at the measured point 208c) that remains of the part. In still further implementations, the wear metric may be some other quantification associated with (or determined from) the distances d1, d2. For example, the amount of remaining (or worn) part may be associated with a time associated with continued use of the part. For instance, the wear part may have a useful part life measured in hours and the percentage of remaining part life (e.g., the ratio of d2 to d1 plus d2) can be expressed as a remaining number of hours of expected use for the part 116. While examples described herein may contemplate a ratio as a technique for determining a wear metric, other techniques also are contemplated. For instance, empirical data relative to the use of certain wear parts may inform a wear characteristic or other wear pattern and one or both of the distances d1, d2, may be used to look up a wear percentage or other wear metric based on such empirically developed information. Although some example implementations of FIG. 2 use both the new part model 214 and the wear limit part model 216, other implementations may use only one of these models. By way of non-limiting example, the wear metric may be determined as one of a distance from the measured point to one of the new point 228 or to the wear limit point 230. For instance, when the distance from the new point 228 to the wear limit point 230 is known, the wear percentage can be determined using only one of d1 or d2.

In the example 226, the orientation of the line 234 is based on characteristics of the bounding model 222a. For instance, in some examples, the line 234 is normal to the bounding model 222a at the point 232. In arrangements, the bounding model may be selected based on an expected wear pattern for the part. By way of non-limiting example, the bounding model 222 may be chosen to orient lines, like the line 234, in a manner best indicative of wear for the part, as described further herein.

Figure 3:
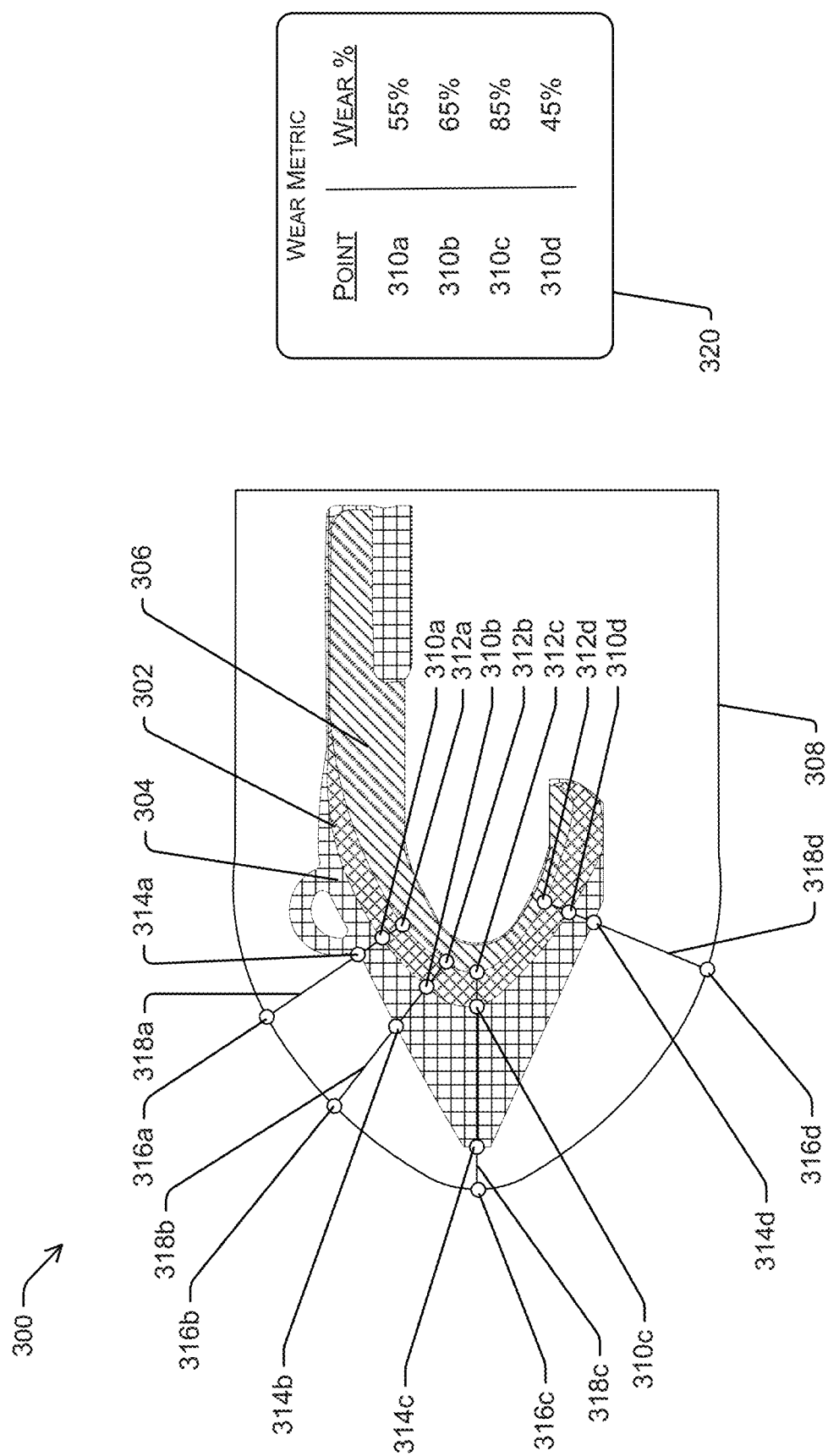
FIG. 3 is a schematic illustration use to show techniques for determining a wear metric of a wear part, according to aspects of this disclosure.

FIG. 3 illustrates an additional example of determining a wear metric, similar to the example 226 accompanying the operation 224. More specifically, FIG. 3 illustrates a representation 300 of an alignment of a measured wear part surface 302 with a new part model 304, which may be the new part model 214, with a worn limit part model 306, which may be the wear limit part model 216, and with a bounding model 308. As noted, the representation 300 is very similar to the representation in the example 226 in FIG. 2. However, in the representation 300, the bounding model 308 may be differently shaped. In some examples, the bounding model 308 may be similar to the third bounding model 222c in the example 220 of FIG. 2. As with the example of FIG. 2, FIG. 3 shows the part in two-dimensions for ease of illustration and clarity, but in implementations, each of the measured surface 302, the new part model 304, the wear limit model 306, and/or the bounding model 308 may be three-dimensional.

As further illustrated in FIG. 3, a first measured point 310a, a second measured point 310b, a third measured point 310c and a fourth measured point 310d (collectively, the measured points 310) are example points on the measured surface 302. The measured points 310 may correspond to returns from the sensor 110 sensing the worn part 116 and/or may be points on a model surface generated from the sensor data. A distance between each of the measured points 310 and a corresponding point on an outer surface of the wear limit part model 306 may represent a remaining thickness of the in-use part (e.g., the worn part 116) proximate the measured point. For example, FIG. 3 also include a first wear limit point 312a, a second wear limit point 312b, a third wear limit point 312c, and a fourth wear limit point 312d (collectively, the wear limit points 312) corresponding, respectively, to the measured points 310. As also illustrated in FIG. 3, a distance between each of the measured points 310 and a corresponding point on the outer surface of the new limit part model 304 may represent an amount of material that has been abraded, degraded, worn-away or otherwise removed from the new part. For example, FIG. 3 also includes a first new point 314a, a second new point 314b, a third new point 314c, and a fourth new point 314d (collectively the new points 314) corresponding, respectively, to the measured points 310. Of course, the measured points 310, the wear limit points 312 and the new points 314 are for example only. In implementations, each measured point 310 will have a corresponding wear limit point 312 and a corresponding new point 314, where the associated measured points 310, wear limit points 312, and new points 314 are colinear, as described herein.

As also described herein, correspondence of the points is determined based at least in part on the bounding model 308. More specifically, the bounding model 308 may inform the orientation of the lines that pass through the measured points 310, which in turn determine the wear limit points 312 and the new points 314 to be considered when determining the wear metric. In the example, a first bounding point 316a, a second bounding point 316b, a third bounding point 316c, and a fourth bounding point 316d (collectively, the bounding points 316) are illustrated on the bounding model 308. A first line 318a extends from the first bounding point 316a through the first measured point 310a, a second line 318b extends from the second bounding point 316b through the second measured point 310b, a third line 318c extends from the third bounding point 316c through the third measured point 310c, and a fourth line 318d extends from the fourth bounding point 318d through the fourth measured point 310d. Collectively, the first line 318a, the second line 318b, the third line 318c, and the fourth line 318d may be referred to as the lines 318. In the illustrated example, each of the lines 318 extends normal to the bounding surface defined by the bounding model 308. In some examples, techniques described herein can determine locations (e.g., locations of points) along the lines 318 and match those locations to measured points 310 to determine a correspondence of measured points 310 to bounding points 316. The wear limit points 312 and the new points 314 may similarly be determined by identifying points on the wear limit model 306 and the new part model 304, respectively, that lie on the lines 318. Although in this example, each of the lines 318 is normal or perpendicular to the bounding model 308, the lines 318 may be otherwise oriented in other implementations. By way of non-limiting example, the lines 318 may be angled at some degree relative to the bounding surface defined by the bounding model 308 other than 90-degrees.

As noted herein, the bounding model 308 may provide an orientation for each of the lines 318 to better estimate part wear. For instance, some techniques may use models like the new part model 304 and/or the wear limit model 306 to determine a wear metric, but such models may calculate the worn distance (e.g., the distance of one of the measured points 302 to the new part model 304) as the distance between the respective one of the measured points 310 and a closest point on the new part model 308. Consider, for example, the third measured point 310c. In the example of FIG. 3, the worn distance may be the distance between the third point 314c on the new part model 304, e.g., along the third line 318c. In examples that do not use the bounding model 308, however, the measured point is closer to several other points on the new part model 304 than to the third new point 314c. By way of non-limiting example, the third measured point 310c is closer to the second new point 314b than to the third new point 314c. Other techniques that use the "closest" point to determine wear would return a much lower wear value than the current techniques, which use the bounding model 308 to orient the direction of the line 318c, and thus determine the third new point 314c and third wear limit point 312c as the points for measuring wear.

Moreover, by identifying the shape and/or contour of the bounding model 308, different result may be achieved. In some examples, it may be desirable than any line normal to the bounding model will pass through each of the measured surface 302, the new model 304, and the wear limit model 306. To achieve such an arrangement, the bounding model 308 may have substantially the same shape as the wear limit model 306. Of course, and as discussed herein, other shapes, including hemi-spheres and/or other concave shapes are contemplated and can be used.

As described above in connection with FIG. 2, the wear metric for the part can be based on distances along the lines 318. For instance, in the illustrated example, the wear metric for the first measured point 310a may be based at least in part on one or more of distances between the first measured point 310a and the first new point 314a, between the first measured point 310a and the first wear limit point 312a, and/or between the first new point 314a and the first wear limit point 312a. For example, FIG. 3 also includes a wear metric table 320 that visually depicts wear metrics or values associated with each of the measured points. In the table, the wear metric is quantified as a wear percentage (wear %) which may be a numerical representation (as a percentage) of the ratio of (1) a distance from one of the measured points 310 to an associated one of the new points 316 to (2) a distance from the associated one of the new points 316 to an associated one of the wear limit points 312. Using the first measured point 310a as an example, the distance from the first measured point to the first new point 314a may be about 55% of the distance from the first new point 314a to the first wear limit point 312a. Thus, as shown in the table 320, the wear metric associated with the first measured point 310a may be 55%. Similarly, wear at the second measured point 310b may be quantified as about 65% (that is, the distance between the second measured point 310b and the second new point 314b is about 65% of the distance from the second new point 314b to the second wear limit point 312b), wear at the third measured point 310c may be quantified as about 85% (e.g., the distance between the third measured point 310c and the third new point 314c is about 85% of the distance from the third new point 314c to the third wear limit point 312c), and wear at the fourth measured point may be quantified as about 45% (e.g., the distance between the fourth measured point 310d and the fourth new point 314d is about 45% of the distance from the fourth new point 314d to the fourth wear limit point 312d). The four measured points 310 are for illustration only—the wear metric table 320 may include any number of points including additional and/or other points on the measured surface 302. Moreover, although termed "measured points" herein, in some examples the points may be any point(s) on the measured surface 302, whether measured directly, or extrapolated or otherwise derived from sensor data.

Moreover, although the wear metric table 320 represents wear as a wear percentage, the table 320 may include additional or alternate metrics. For instance, the inverse of the illustrated percentage may be included as a "remaining part percentage" or similar metric. In other examples, the wear metric table 320 can include metrics other than those expressed as percentages. By way of non-limiting example, the wear metric may be expressed as a thickness (e.g., in millimeters, centimeters, inches, or the like) of material removed (e.g., a length associated with the distance from individual of the measured points 310 to a corresponding one of the new points 314) or of material remaining (e.g., a length associated with the distance from individual of the measured points 310 to a corresponding one of the wear limit points 312). In some examples, metrics other than wear percentage may be particularly of interest and/or may be more intuitive for some machine operators and/or technicians. For instance, the wear metric table 320 shows a relatively wide range of wear percentages, e.g., 45% to 85%, whereas the thickness of the material at each of the measured points 310 (e.g., measured from the wear limit model 306) is relatively uniform. Stated differently, and using specific point on FIG. 3, the distance from the third measured point 310c to the third wear limit point 312c is very close to the distance between the fourth measured point 312d and the fourth wear limit point 312d, despite the wear percentages being 85% and 45%, respectively. In this example, wear along the third line 318c is more rapid than wear along the fourth line 318d, thus causing the disparity in wear percentages. However, a technician may be more interested to know the thickness of remaining material than the percentage. In still further examples, the wear metric table 320 may also or alternatively include an indication of an expected life of the part. For instance, the wear part may have an expected useful life, which may be measured in hours. In implementations, the wear percentage may correspond to a remaining life of the part. Thus, for example, assume that a part under consideration is expected to last for 100 hours. In this example, the 85% wear associated with the third measured point 310c may indicate that the part has 15 hours of life remaining before it should be replaced. In other examples, a remaining life may otherwise be determined on a per-point basis. For instance, empirical studies of worn parts may be used to develop a lookup table or other database that associates part life, e.g., remaining part life, with one or more of wear distance, remaining part thicknesses, and/or wear percentages, e.g., as determined from the techniques illustrated in FIG. 3. Such calculations may also take into account the conditions, including but not limited to, a task being performed, a composition of material or other conditions causing the wear, metrics associated with the user 106 (e.g., when the user is the operator of the machine 104), or other information affecting wear of the part.

Figure 4:
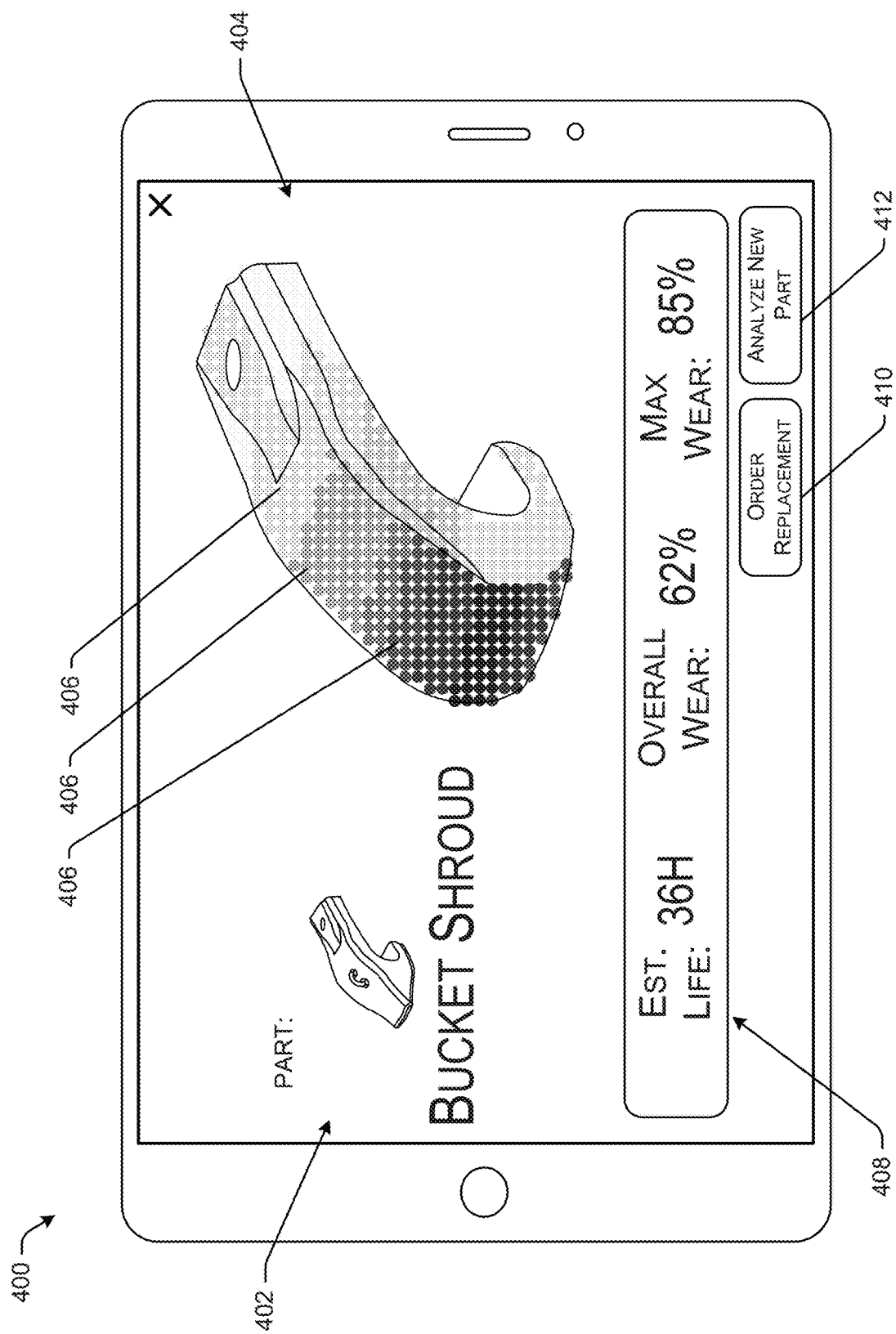
FIG. 4 is a schematic illustration of an example user interface depicting wear metrics for a wear part, such as the part illustrated in FIG. 2, according to additional aspects of this disclosure.

Techniques described herein may include providing information about the wear determined according to implementations described in connection with FIG. 2 and/or FIG. 3 to a user, such as the user 106. By way of non-limiting example, the data processing system(s) 120 may send signals, e.g., including information about the wear metric(s), to the user device 108 to provide information about wear parts on the machine 104 to the user 106. For example, FIG. 4 illustrates a wear part status interface 400. The interface 400 is illustrated as being displayed on the user device 108, e.g., for viewing by the user 106. The interface 400 may have one or more user interface elements allowing the user 106 to provide or control information about the status of wear parts, such the worn part 116, e.g., a ground-engaging tooth. The interface 400 may include a part identification region 402 displaying a representation of the part under consideration, e.g., being analyzed. In the example, the part identification region 402 includes both a visual representation of the part, e.g., a digital image of a new part (which may be the new part 114) corresponding to the measured part (the worn part 116), and a textual description of the part, e.g., the text "bucket tooth." In other examples, the part identification region 402 may include alternate or additional information. For instance, and without limitation, the part identification region 402 also may include an identification of a part number, and identification of the machine 104 with which the part is associated, a location of the part on the machine 104, and/or additional information.

The interface 400 may further include a wear representation 404, which may be a visual depiction of the sensed part, e.g., corresponding to the sensor data generated by the sensor 110, along with information about wear determined by the data processing system(s) 120 according to techniques described herein. In the example, the wear representation 404 includes a color-coded heat map or similar representation generally showing the amount of wear. More specifically, the wear representation includes a number of points 406 that are color-coded to demonstrate wear. More specifically, points 406 associated with sections of the part that are more worn are represented as relatively darker points in the wear representation 404 whereas points 406 associated with sections of the part that are less worn are relatively lighter. Although the image is shown in black and white, other implementations may use other color coding schemes. By way of non-limiting example, the wear representation 404 may use shades of red to show points 406 associated with wear over 65%, shades of green to show points 406 having wear below 35% and shades of yellow to show points 406 associated with wear between 35% and 65%. Of course, these colors and values are for example only; other colors and/or values may be used. Moreover, the points 406 may be relatively smaller, e.g., pixel-sized, and/or may be replaced by some other graphical representation. In some examples, each of the points 406 may correspond to one or the measured points 208, 310 although such is not required. Generally, the wear representation 404 may provide an intuitive graphic that allows the user 106 to readily understand the health of the measured part.

The interface 400 can also include additional information to help the user 106 to understand the health of the measured part. As illustrated in FIG. 4, the interface 400 can also include a status bar 408 that includes information about the part. In the illustration, the status bar 408 includes an indication of a remaining life of the part (36 hours in the example), an indication of an overall wear for the part (62%), and an indication of a maximum wear for the part (85%). In implementations, the interface 400 may include additional or different information than shown in the status bar 408. By way of non-limiting example, the interface 400 can include information about other wear metrics described herein. Moreover, and although not illustrated in FIG. 4, the interface 400 can include interactive features to allow the user 106 to glean additional information about the measured part. By way of non-limiting example, the user 106 may select points on the wear representation 404 and receive information about those specific points. For example, a pop-up window may be displayed on the interface 400 that includes information about wear metrics for a selected one of the points 406 or a region.

Also in examples, the interface 400 may further have interactive controls for taking or instructing actions relative to the measured part. For example, an "order replacement" user interface element 410 may be a selectable region displayed on the interface 400 that, when selected by the user 106, causes a replacement part to be ordered. For example, the user device 108 may generate and transmit a signal to the dealer computing device(s) 122 to order a replacement part from the dealer. In some examples, selection of the order replacement user interface element may open a new user interface (not shown) via which the user 106 can place an order, check inventory, and/or take some additional action. The interface 400 also is illustrated as including an "analyze new part" interface element 412. This element may be a selectable region displayed on the interface 400 that, when selected by the user 106, may render an interface similar to the interface 400, but pertaining to a different measured part. For example, when a machine like the machine 104 includes multiple teeth, the user 106 may be able to receive information about different of the teeth by selecting the element 412. By way of non-limiting example, selection of the element 412 may cause rendering of a pop-up menu or similar visual listing the wear parts that may be investigated by the user 106. Although not illustrated, the interface 400 can also promote or enable different actions by the user 106 relative to wear parts. For example, in instances in which the sensor 110 is integrated into or in communication with the user device 108, the interface 400 may facilitate the capture of sensor data using the sensor 110. Moreover, and as noted above, in some implementations functionality associated with the wear determination component 124 can be performed by the user device 108. In these examples, the interface 400 may include one or more interface elements that cause the user device 108 to execute instructions to determine wear metrics associated with a wear part.

Figure 5:
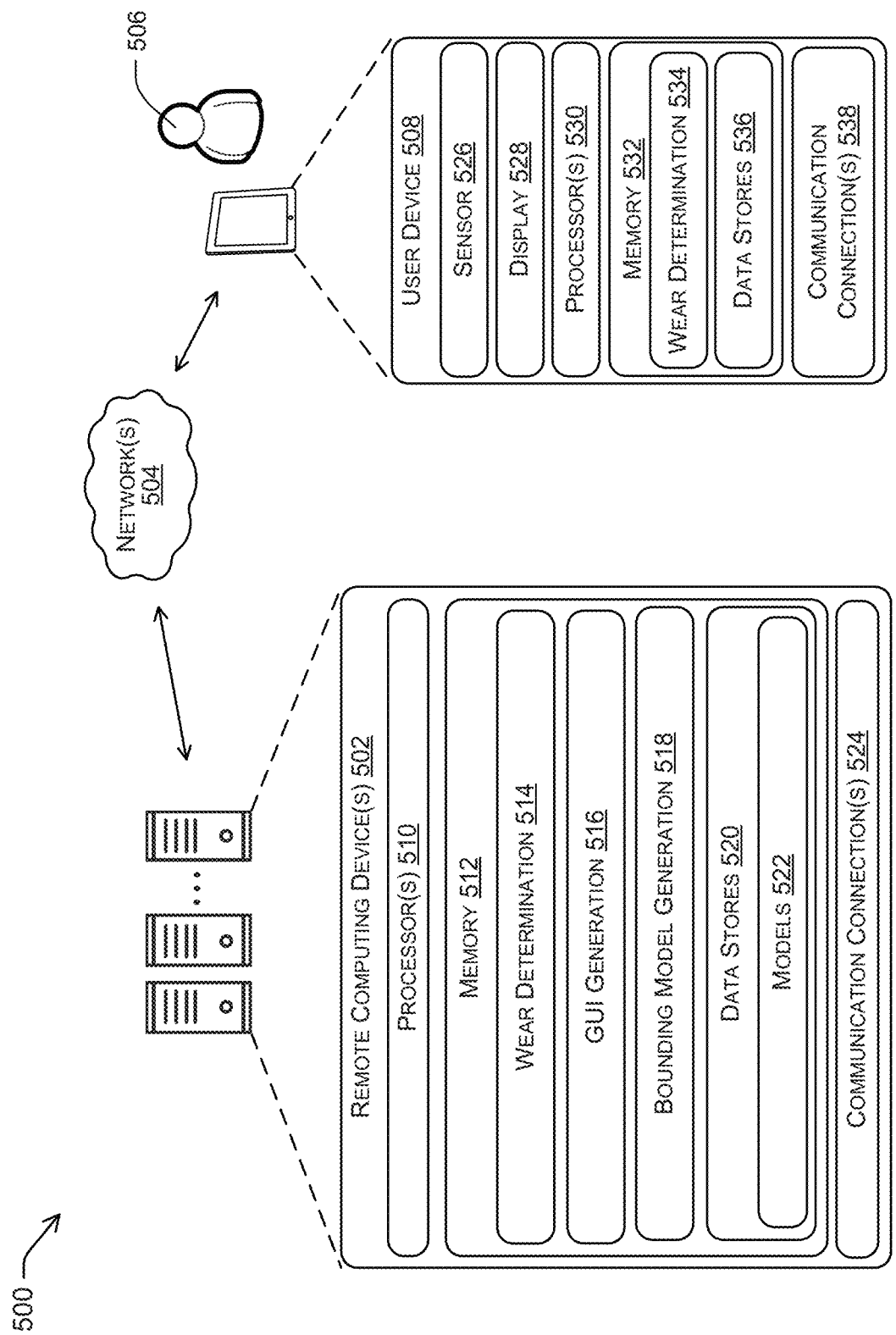
FIG. 5 is an example computing environment for determining a wear metric for a wear part, according to aspects of this disclosure.

FIG. 5 is a diagram illustrating an example system 500 for quantifying part wear in accordance with implementations described herein. In at least one example, the system 500 can include one or more remote computing device(s) 502 communicating over one or more networks 504 with a user device 508 which may be associated with a user 506. The remote computing device(s) 502 may be the data processing system(s) 120, in some examples. The user device 508 may be the user device 108, and the user 506 may be the user 106, for example. Some non-limiting examples of the user device 508 may include tablet computing devices, desktop computing devices, laptop computing devices, mobile computing devices, or any other device capable of accessing and rendering graphical user interfaces and communicating with the remote computing device(s) 502. The network(s) 504 may include a local area network (LAN), a wide area network (WAN), including but not limited to the Internet, or any combination thereof, and may include both wired and wireless communication technologies using any suitable protocols and communication techniques.

The remote computing device(s) 502 can include processor(s) 510 and memory 512 communicatively coupled with the processor(s) 510. In the illustrated example, the memory 512 of the remote computing device(s) 502 stores a wear determination system 514, a graphical user interface (GUI) generation system 516, and a bounding model generation system 518. Although these systems are illustrated as, and will be described below as, separate components, functionality of the various systems may be attributed differently than discussed. Moreover, fewer or more systems and components may be utilized to perform the various functionalities described herein. The memory 512 may also include data stores 520, which may include models 522. Though depicted in FIG. 5 as residing in the memory 512 for illustrative purposes, it is contemplated that the wear determination system 514, the GUI generation system 516, the bounding model generation system 518, and/or any or all of the data stores 520 may additionally, or alternatively, be accessible to the remote computing device(s) 502 (e.g., stored on, or otherwise accessible by, memory remote from the remote computing device(s) 502).

In at least one example, the wear determination system 514 can include functionality to determine a wear metric associated with a wear part, such as the worn part 116. For example, the wear determination system 514 may be substantially the same as the wear determination component 124 discussed above. In examples, the wear determination system 514 can received sensor data of a measured part, align the sensor data with one or more models 522 stored in the data stores 520. The models 522 can include a new part model and a worn part model. In example implementations, the worn part model can correspond to a wear limit for the part.

In some examples, the GUI generation system 516 can include functionality to generate one or more interactive interfaces, such as the GUI 400 for presentation on the user device 508. In some examples, the GUI generation system 516 may receive information from the wear determination system 514 and/or the models 522 to generate the GUIs. By way of nonlimiting example, and with reference to FIG. 4, the GUI generation system 516 may receive information about the amount of wear from the wear determination system 514 and details about a new part model from the models 522 to generate the representation 404 and the depiction 402, respectively.

The bounding model generation system 518 may include functionality to determine a bounding model, structure or contour that may be used as a reference to determine a wear metric, as described herein. In examples, the bounding model generation system may be the same as the bounding surface determination component 128. For instance, the bounding model generation system 518 may determine the bounding structure based on the part under consideration and/or other factors. As detailed herein, the bounding model can be used as a reference contour that orients measurements used to determine wear. In some examples, the bounding model generation system 518 can retrieve the bounding model from memory, e.g., from one of the models 522. In other examples, the bounding model generation system 518 may determine the bounding model using a model, such as a wear limit part model.

The remote computing device(s) 502 may also include communication connection(s) 524 that enable communication between the remote computing device(s) 502 and other local or remote device(s), including but not limited to the dealer computing device(s) 122. For instance, the communication connection(s) 524 can facilitate communication with the user device 508, such as via the network(s) 504. The communication connection(s) 524 can enable Wi-Fi-based communication such as via frequencies defined by the IEEE 802.11 standards, short range wireless frequencies such as BLUETOOTH®, other radio transmission, or any suitable wired or wireless communications protocol that enables the respective computing device to interface with the other computing device(s).

In some implementations, the remote computing device(s) 502 can send information, such as instructions to generate GUIs, to the user device 508, via the network(s) 504. The user device(s) 508 can receive such information from the remote computing device(s) 502 and display the GUIs on a display 528 of the user device 508. In some implementations, the user device 508 can perform some of the functions attributed to the remote computing device(s) 502, including generating the GUIs, for example. To facilitate creation of the GUIs, the user device 508 may receive information from the remote computing device(s) 502. In at least one example, the user device 508 can include one or more processors 530 and memory 532 communicatively coupled with the processor(s) 530. In the illustrated example, the memory 532 of the user device 508 may store a wear determination component 534 and/or include data stores 536. In examples, the wear determination component 534 can be substantially the same as the wear determination system 514 and the data stores 536 can include some or all of the same information stored in the data stores 520.

The user device 508 may also include communication connection(s) 538 that enable communication between the user device 508 and other local or remote device(s). For instance, the communication connection(s) 538 can facilitate communication with the remote computing device(s) 502, such as via the network(s) 504. The communications connection(s) 538 can enable Wi-Fi-based communication such as via frequencies defined by the IEEE 802.11 standards, short range wireless frequencies such as BLUETOOTH®, other radio transmission, or any suitable wired or wireless communications protocol that enables the respective computing device to interface with the other computing device(s).

As also illustrated in FIG. 5, the user device 508 may also include a sensor 526. For instance, the sensor 526 may be the same as the sensor 110, and may be integrated into the user device 508 or otherwise in communication with the user device 508. In examples, the sensor 526 may be an imaging device configured to capture three-dimensional sensor data associated with a worn part, as described herein. The sensor 526 may be a ranging sensor, such as a radar sensor, a LiDAR sensor, a time-of-flight sensor, or the like. In other examples, the sensor 526 can be a three-dimensional camera.

The processor(s) 510 of the remote computing device(s) 502 and the processor(s) 530 of the user device 508 can be any suitable processor capable of executing instructions to process data and perform operations as described herein. By way of example and not limitation, the processor(s) 510, 530 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 512 and the memory 532 are examples of non-transitory computer-readable media. The memory 512, 532 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Although various systems and components are illustrated as being discrete systems, the illustrations are examples only, and more or fewer discrete systems may perform the various functions described herein. Moreover, functionality ascribed to the remote computing device(s) 502 may be performed at the user device 508 and/or functionality ascribed to the user device 508 may be performed by the remote computing device(s) 502.

Figure 6:
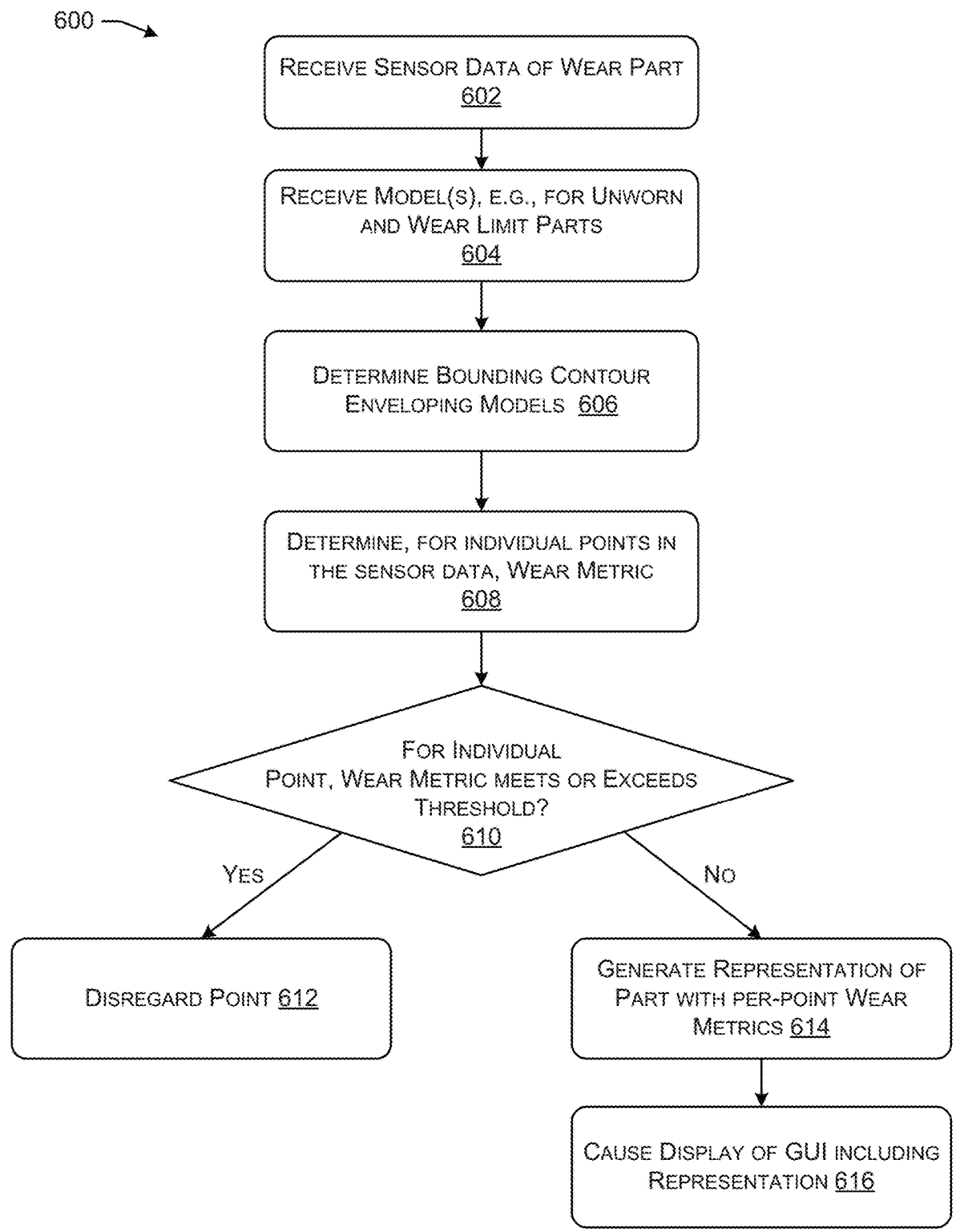
FIG. 6 is a flowchart of an exemplary method for determining a wear metric of a wear part, according to aspects of this disclosure.
Figure 7:
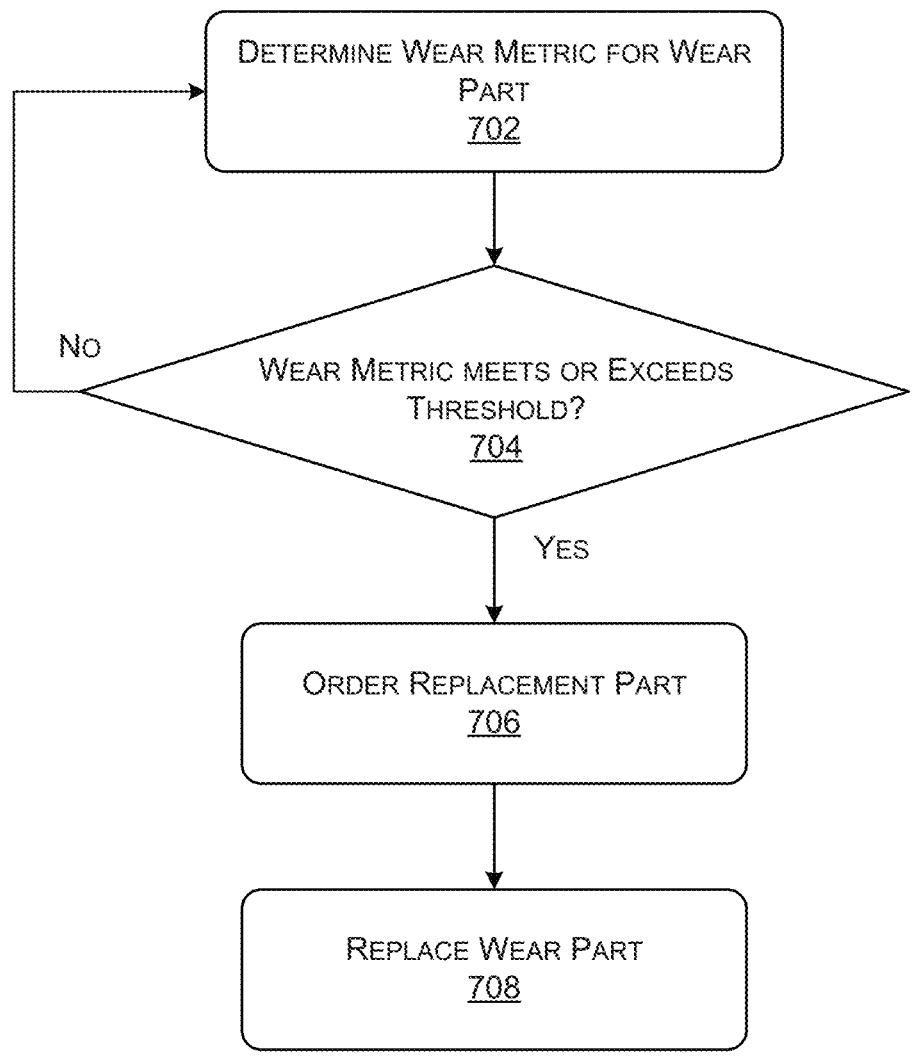
FIG. 7 is a flowchart of an example method for taking action in response to determining a wear metric for a wear part, according to aspects of this disclosure.

FIGS. 6 and 7 illustrate flow charts depicting example processes 600, 700 of the present disclosure, which may be related to determining part wear, as descried herein. The example processes 600, 700 (as well as the process 200 illustrated in FIG. 2 and discussed above) are illustrated as a collection of steps in a logical flow diagram, which steps represent acts or operations that can be implemented in hardware, software, or a combination thereof. In the context of software, the steps represent computer-executable instructions stored in memory. When such instructions are executed by, for example, the processor(s) 510, 530, such instructions may cause the processor(s) 510, 530 and/or various components of the computing device(s) 502 and/or the user device 508 to perform the recited acts or operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 600, 700 can be combined in whole or in part with other methods.

In more detail, FIG. 6 shows an exemplary process 600 for determining wear of a wear part, such as the worn part 116, which may be associated with a machine, such as the machine 104. The process 600 may be performed by the data processing system(s) 120, the remote computing device(s) 502, and/or the user devices 108, 508, although other components may perform some or all of the operations of the process 600. In addition, the operations of the process 600 need not necessarily be performed in the order shown in FIG. 6, and may be performed in different orders consistent with the disclosed embodiments.

At operation 602, the process 600 can include receiving sensor data of a wear part. For example, the data processing system(s) 120 may receive sensor data generated by the sensor 110 of a wear part, such as the worn part 116, in use on the machine 104. In examples, the user 106 may be prompted to capture specific views of the worn part 116 using the sensor 110. By way of non-limiting example, the sensor 110 may be mounted on a stanchion or other frame that is configured to arrange the sensor 110 relative to the worn part 116. In at least some examples, the sensor data may be point cloud data comprising a plurality of points and depths associated with the points (e.g., depths relative to sensor 110). In examples, the sensor 110 may be a range-finding sensor, such as a time-of-flight sensor, a LiDAR sensor, a radar sensor, 3D scanner, or the like.

At operation 604, the process 600 can include receiving models for unworn and/or wear limit parts. For example, the data processing system(s) 120 may retrieve, access, or otherwise receive information, e.g., in the form of one or more part models, that describe or are otherwise associated with, the worn part 116. In some examples, the part models can include a new part model, such as the new part models 214, 304, which may be representative of the new part 114. Such new part model may include coordinates or extents of a surface of a new, e.g., substantially unused, part. In examples, the new part model may be characterized by nominal or "to specification" measurements. The part models can also or alternatively include a wear limit part model, such as the wear limit part models 216, 306. Such wear limit part models may include coordinates or extents of a surface of a part worn to a wear limit, which may be a predetermined wear limit. In examples, the wear limit may correspond to a limit associated with an imminent failure of the part or some other wear limit. In at least some examples, the wear limit may be determined empirically.

At operation 606, the process 600 can include determining a bounding contour or bounding model enveloping the models. For example, the data processing system(s) 120 may retrieve, access, generate, or otherwise determine a bounding model, like the bounding models 222, 308. As described herein, the bounding model may define orientations or directions along which wear is to be determined by the wear determination components 124, 514, 534. In examples, the bounding model may be any generally convex shape, structure, or surface that at least partly envelopes measured points and surfaces defined by the model(s) received at the operation 604. In some instances, the bounding model may closely approximate the shape of the wear limit part model, but larger.

At operation 608, the process 600 can include determining, for individual points in the sensor data, a wear metric. For example, the operation 608 can include aligning the sensed points (or a model representing the sensed points or other sensor data), the model(s), and the bounding contour in a coordinate system, e.g., a three-dimensional coordinate system, and measuring distances between the models along lines oriented in accordance with the bounding model. For instance, for each of the measured points 208, 310, a distance may be determined from the point to one or both of a point on the new model, e.g., one of the new points 228, 314, and/or a point on the wear limit model, e.g., one of the wear limit points 230, 312. Such distances are measured along the lines 234, 318, which lines are oriented according to the bounding structure 222, 308. In at least some examples, the lines 234, 318 can be lines normal to the bounding structure or model and passing through the measured points 208, 310, as described herein. The wear metric may further be determined based at least in part on these distances. For instance, in the example of FIG. 3, the wear metric can be a wear percentage, which may be the ratio of a first distance (from the measured point to the new point) and a second distance (from the new point to a corresponding wear limit point, where the new point, the measured point, and the wear limit point are colinear).

At operation 610, the process 600 can determine whether the wear metric associated with individual measured points meets or exceeds a threshold wear limit. For example, the operation 610 may be a type of filter that removes outliers. By way of non-limiting example, points in the sensor data may be associated with surrounding components or objects in an environment of the wear part of interest and such returns can return wear metrics in excess of a predetermined threshold, e.g., greater than 100%. In examples, it may be desirable to retain all points that return a wear percentage up to and including a value over 100%. In some instances, a portion of the worn part may be worn more than the wear limit, e.g., when the wear limit corresponds to coordinates of a surface of a wear part that suggest part replacement, but may not be associated with part failure. Similarly, returns associated with positions of mounting holes, mounting features, features that are not expected to wear, or other apertures can be calculated to have excessive wear, may be filtered out by the operation 610.

In examples, if it is determined at the operation 610 that the individual point meets or exceeds the wear threshold, an operation 612 can include disregarding the point. As noted above, points having exceptionally high wear metrics, e.g., greater than or equal to 125% in some examples, may be assumed to be anomalous, and thus may be omitted from further consideration.

Alternatively, if at the operation 610 it is determined that the wear metric does not meet or exceed the threshold, the process 600 can include, at operation 614, generating a representation of the part with per-point wear metrics. That is, the measured points that are not filtered out at the operation 610 may be used to identify to the user 106 wear associated with the part. FIG. 4, discussed above, contains an example wear part representation 404 that visualizes wear on a wear part on a per-point basis, e.g., as a heat map.

At operation 616, the process 600 can include causing display of a graphical user interface including the representation. For example, the data processing system(s) 120 can generate a graphical user interface, like the graphical user interface 400, and send information that causes the user device 108 to render the graphical user interface 400 on its display. In examples, the interface 400 can display additional information about the wear part, including one or more additional wear metrics, information about the wear part, e.g., a type or model, instructions and/or controls for ordering replacement parts, or other information.

FIG. 7 shows an example process 700 for replacing a wear part, e.g., when the wear part, or a portion of the wear part, indicates that the part is no longer effective and/or is likely to fail. In some examples, the process 700 can be performed by one or more components in the environment 100 although other components may perform some or all of the operations of the process 700. The operations of the process 700 need not necessarily be performed in the order shown in FIG. 7, and may be performed in different orders consistent with the disclosed embodiments.

At operation 702, the process 700 can include determining a wear metric for a wear part. For example, the operation 702 can include all or portions of the processes 200, 600 described herein. In implementations, the wear metric can be a per-point wear metric, e.g., for individual of multiple measured points, or can be a single metric associated with the entire part. By way of non-limiting example, a wear metric descriptive of the entire part can be an average or weighted-average of all or a subset of all per-point wear metrics. In at least one example, a wear metric for a part may be an average of some predetermined number (e.g., the highest 30) or percentage (e.g., the top 10% of all points) of determined wear metrics. In other examples, the wear metric for the part can be a greatest calculated wear metric over measured points. Other metrics also are contemplated herein, and will be appreciated by those having ordinary skill in the art with the benefit of this disclosure.

At operation 704, the process 700 can include determining whether the wear metric meets or exceeds a wear threshold. For example, an operator, foreman, administrator, manufacturer, technician, or other entity associated with the wear part or a machine using the wear part may determine that parts having wear above a predetermined threshold, e.g., above 85%, 90%, 95% etc. wear, should be replaced. Thus, the operation 704 can determine whether the wear metric determined at the operation 702 meets or exceeds this threshold.

If, at the operation 704 it is determined that the wear metric does not meet or exceed the threshold, the process 700 returns to the operation 702 to continue to determine part wear, Specifically, in this scenario the part is still usable.

In contrast, if, at the operation 704 it is determined that the wear metric meets or exceeds the threshold wear, at operation 706 the process 700 can include ordering a replacement part. For example, the data processing system(s) 120 and/or the user device 108 may send a signal or other information to the dealer computing device(s) 122 to instruct the dealer computing device(s) 122 to send a replacement part and/or schedule maintenance to install the new replacement part. In other instances, the dealer computing device(s) 122 may receive information about the wear metric, and determine that the wear part should be replaced. In some examples, the threshold wear metric may be determined based at least in part on a length of time to obtain a replacement wear part. For instance, when a replacement wear part is stocked at a location proximate the worksite at which the machine is operating, the part may be allowed to approach a relatively higher wear percentage, e.g., because it may be immediately replaced if it fails. Alternatively, if replacement parts are not available on-site, the threshold wear metric may be relatively lower, e.g., to allow additional time to receive a replacement part.

At operation 708, the process 700 can include replacing the wear part. For example, a technician or other entity may be scheduled to replace the wear part with the replacement part ordered at the operation 706. As described herein, maintaining machines with wear parts that are not overly worn can increase machine efficiency and performance.

Although not explicitly included in FIG. 7, techniques herein may take one or more additional or alternate actions based on the determination that the wear metric meets or exceeds the threshold (e.g., at the operation 704), including any combination of, for example:

- Providing signals to change an indicator light in an operator station of the machine 104 from green (continue working) to red (stop working) so the operator knows a wear part may be subject to imminent failure. The operator may then manually control the machine 104 to stop a current earth-moving operation using the part and/or take actions to investigate the wear and/or replace the worn part.
- Providing signals to the user device 108 indicating that a wear part is in need of replacement. The user device 108 may, in turn, provide a visual indication on the display (e.g., a "Stop Use" message), e.g., via the interface 400, letting the operator know that the wear part may be subject to imminent failure. The operator may then manually control the machine 104 to stop the current earth-moving operation using the part, or take some other action.
- Providing signals to a module included on the machine 104 indicating that a wear part is at risk of imminent failure and/or in need of replacement. The machine module, in turn, may provide signals to components on the vehicle to stop the machine 104 or otherwise limit additional wear on the wear part.
- Providing signals to a speed control module indicating that the wear part is in need of replacement. In response to the signal(s), the speed control module may be configured to limit use of the machine 104 by reducing the speed of the machine 104, stopping the machine 104, reducing the throttle or the speed of a power source associated with the machine, or the like.
- Providing signals to an autonomous control module associated with the machine 104 indicating that the wear part is in need of replacement. In response to the signals, the autonomous control module may, for example, change the current operating mode of the machine 104 or perform other functions to reduce or prohibit additional wear.

INDUSTRIAL APPLICABILITY

The disclosed systems and methods find application in any environment in which a user wishes to determine the degree of wear of a wear part. By using a sensor to capture sensor data of the wear part, e.g. depth of points on a surface of the wear part, and determine the degree of wear from the sensor data, the disclosed systems and methods allow the user to easily assess the part, even in the absence of detailed knowledge about the part, the part's wear characteristics, or the machine.

For example, and with reference to FIG. 1, the user 106 may operate the machine 104 at the machine site 102. After finishing a shift, or at some other interval, the user 106 may dismount the machine 104 and use the sensor 110 to capture sensor data about the worn part 116, e.g., a tooth on the bucket of the machine 104. The user 106 may then, using the mobile device 108 in communication with the sensor 110, transmit the sensor data to a remote computing system, such as the data processing system(s) 120. The data processing system(s) 120 may then determine an amount of wear of the sensed points to one or more part model(s) 126 using a bounding surface 222. In more detail, the data processing system(s) 120 may use a wear determination component 124 to determine distances between measured points on the sensed part and corresponding positions on a new part model 214 and/or a worn or wear limit part model 216. These measured distances may be along a line oriented in accordance with the bounding surface 222. In at least some examples, the line may be oriented normal to the bounding surface. In examples, when it is determined that the wear metric associated with the sensed part indicates that the part is in need of replacement, the data processing system(s) 120 may communicate such need to dealer computing device(s) 122, which may take some action, such as ordering a new part 114, e.g., using the fulfillment component 130.

Techniques described herein may improve efficiency at work sites, such as the machine site 102, and/or improve efficiency of machines, like the machine 104. By way of example and not limitation, techniques described herein can ensure that wear parts are properly maintained and/or replaced, which can lead to more efficient use of the machine 104, including but not limited to reduced fuel consumption and/or wear of other, ancillary parts. For instance, when teeth such as those shown in the enlarged view 112 in FIG. 1 are not replaced, but instead are allowed to fail, a bucket to which the teeth are attached may begin to wear or otherwise deteriorate. In this example, replacing or repairing the bucket is much more expensive, both financially and in terms of machine downtime, than properly replacing the worn part 116 with a new part 114. Moreover, using parts that are not excessively worn or spent can complete tasks more quickly than with worn, broken, and/or missing parts.

One having ordinary skill in the art will appreciate the computer programs for implementing the disclosed techniques may be stored on and/or read from computer-readable storage media. The computer-readable storage media may have stored thereon computer-executable instructions which, when executed by a processor, cause the computer to perform, among other things the processes disclosed herein. Exemplary computer-readable storage media may include magnetic storage devices, such as a hard disk, a floppy disk, magnetic tape, or other magnetic storage device known in the art; optical storage devices, such as CD-ROM, DVD-ROM, or other optical storage devices known in the art; and/or electronic storage devices, such as E PROM, a flash drive, or another integrated circuit storage device known in the art. The computer-readable storage media may be embodied by one or more components of the environment 100.

It will be apparent to those skilled in the art that various modifications and variations can be made to the disclosed payload overload control system without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims and equivalents thereof.

What is claimed is:

1. A computer-implemented method comprising:
   receiving sensor data corresponding to a surface of a part, the sensor data comprising information about a plurality of points on the surface;
   receiving a first model associated with an unworn part corresponding to the part, the first model defining a first contour of the unworn part;
   receiving a second model associated with a wear limit part corresponding to the part, the second model defining a second contour of the wear limit part;
   generating a bounding contour spaced from the surface, the first contour, and the second contour;
   determining, for a point of the plurality of points, at least one of:
      a first distance between the point and a first position on the first contour; or
      a second distance between the point and a second position on the second contour; and
   determining, based on the at least one of the first distance or the second distance, a wear metric associated with the part,
   wherein the first distance and the second distance are along a line extending from the bounding contour and through the point.

2. The computer-implemented method of claim 1, wherein the point is a first point and the wear metric is a first wear metric associated with the first point, the computer-implemented method further comprising:
   determining, for a second point of the plurality of points, at least one of:
      a third distance between the second point and a third position on the first contour, or
      a fourth distance between the second point and a fourth position on the second contour, wherein the third distance and the fourth distance are along a second line extending from the bounding contour and through the second point; and
   determining a second wear metric associated with the second point.

3. The computer-implemented method of claim 2, further comprising determining an overall wear metric for the part based at least in part on the first wear metric and the second wear metric.

4. The computer-implemented method of claim 3, wherein the overall wear metric is one of an averaged determined using the first wear metric and the second wear metric or a maximum value of the first wear metric or the second wear metric.

5. The computer-implemented method of claim 2, further comprising:
   based at least in part on the second wear metric meeting or exceeding a threshold wear metric, determining an overall wear metric of the part at the exclusion of the second wear metric.

6. The computer-implemented method of claim 1, wherein the line is normal to the bounding contour.

7. The computer-implemented method of claim 1, wherein the bounding contour has a first shape and the first contour has a second shape different from the first shape.

8. The computer-implemented method of claim 1, further comprising:
   aligning a representation of the surface of the part, the first contour, and the second contour in a coordinate system; and
   generating the bounding contour to at least partially envelope the surface, the first contour, and the second contour in the coordinate system,
   wherein the first distance and the second distance are distances in the coordinate system.

9. The computer-implemented method of claim 1, further comprising:
generating display data associated with a graphical representation of the part and a visual representation of the wear metric; and
providing the graphical representation of the part and the visual representation to a display device for display.

10. The computer-implemented method of claim 1, wherein:
the first contour is based at least in part on a first three-dimensional model of the unworn part;
the second contour is based at least in part on a second three-dimensional model of the wear limit part, and
the bounding contour is a three-dimensional contour.

11. The computer-implemented method of claim 1, wherein the wear metric is a wear percentage comprising a ratio of the at least one of the first distance or the second distance to a third distance between the first position on the first contour and the second position on the second contour.

12. A system comprising:
one or more processors; and
computer-readable media storing instructions that, when executed, cause the one or more processors to performs acts comprising:
receiving data corresponding to a surface of a part, the data including information about a plurality of points on the surface;
receiving a first model associated with an unworn part corresponding to the part, the first model defining a first contour of the unworn part;
receiving a second model associated with a wear limit part corresponding to the part, the second model defining a second contour of the wear limit part;
generating a bounding contour spaced from the surface, the first contour, and the second contour;
determining, for a point of the plurality of points, at least one of:
a first distance between the point and a first position on the first contour; or
a second distance between the point and a second position on the second contour; and
determining, based on the at least one of the first distance or the second distance, a wear metric associated with the part.

13. The system of claim 12, wherein the at least one of the first distance or the second distance is along a line extending from the bounding contour and through the point.

14. The system of claim 12, wherein the point is a first point and the wear metric is a first wear metric associated with the first point, wherein the instructions further cause the one or more processors to perform acts comprising:
determining, for a second point of the plurality of points, at least one of:
a third distance between the second point and a third position on the first contour, or
a fourth distance between the second point and a fourth position on the second contour, wherein the at least one of the third distance or the fourth distance is along a second line extending from the bounding contour and through the second point; and
determining a second wear metric associated with the second point.

15. The system of claim 14, further comprising:
determining an overall wear metric for the part based at least in part on the first wear metric and the second wear metric.

16. The system of claim 14, wherein:
the first contour is based at least in part on a first three-dimensional model of the unworn part;
the second contour is based at least in part on a second three-dimensional model of the wear limit part, and
the bounding contour is a three-dimensional contour.

17. Non-transitory computer-readable media storing instructions that, when executed, cause one or more processors to perform operations comprising:
receiving information about an outer surface of a wear part, the information comprising a plurality of points in a three-dimensional coordinate system;
receiving a first model associated with a first three-dimensional representation of a surface of an unworn part corresponding to the wear part;
receiving a second model associated with a second three-dimensional representation of a surface of a wear limit part corresponding to the wear part;
receiving a third model associated with a bounding contour at least partially enveloping the surface of the unworn part;
determining at least one of:
a first distance between a first position on the bounding contour and an individual point,
a second distance between the first position on the bounding contour and a second position on the surface of the unworn part, or
a third distance between the first position on the bounding contour and a third position on the surface of the wear limit part,
wherein the second distance and the third distance are measured along a direction extending from the first position on the bounding contour and through the individual point; and
determining, based at least in part on the at least one of the first distance, the second distance, or the third distance, a wear metric for the wear part.

18. The non-transitory computer-readable media of claim 17, wherein the wear metric is a wear percentage based at least in part on:
a first ratio of the first distance less the second distance to a fourth distance between the second position on the surface of the unworn part and the third position on the surface of the wear limit part; or
a second ratio of the third distance less the first distance to the fourth distance.

19. The non-transitory computer-readable media of claim 17, wherein the determining the wear metric comprises filtering one or more wear metrics associated with one or more individual points based at least in part on the one or more wear metrics equaling or exceeding a threshold wear metric.

20. The non-transitory computer-readable media of claim 19, wherein the wear metric for the wear part is an overall wear metric based at least in part on wear metrics associated with non-filtered wear metrics.

* * * * *